R. F. DE TOLNA.
CHARTING APPARATUS FOR SHIPS.
APPLICATION FILED OCT. 1, 1919.
1,389,295.
Patented Aug. 30, 1921.
2 SHEETS—SHEET 1.
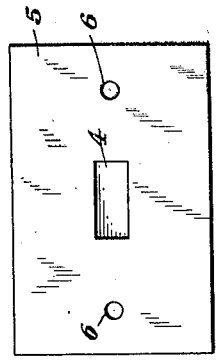
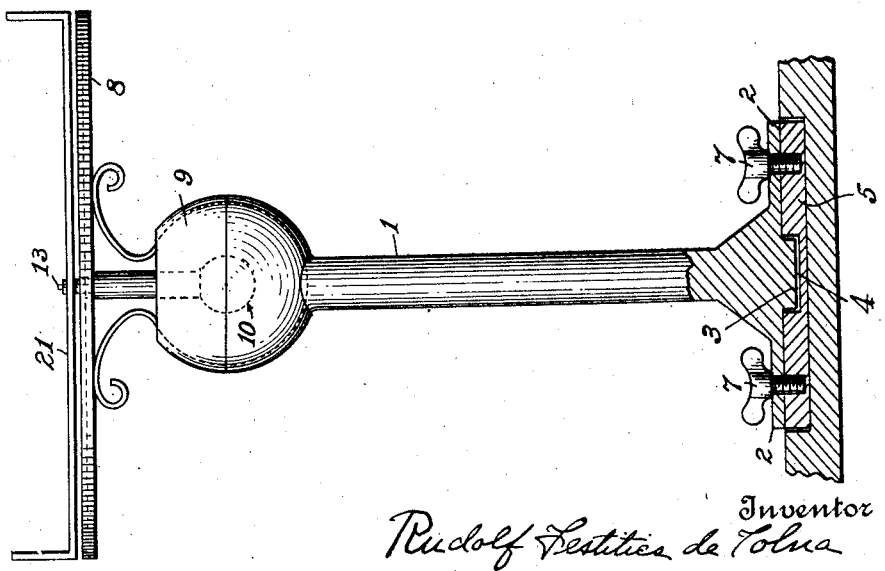
Inventor
Rudolf Festitics de Tolna
By his Attorney
Royal W. France R. F. DE TOLNA.
CHARTING APPARATUS FOR SHIPS.
APPLICATION FILED OCT. 1, 1919.
1,389,295.
Patented Aug. 30, 1921.
2 SHEETS—SHEET 2.
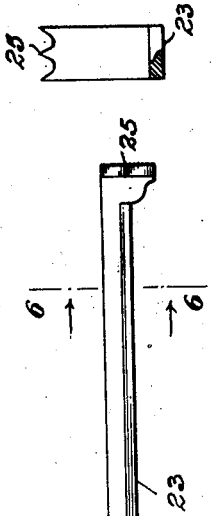
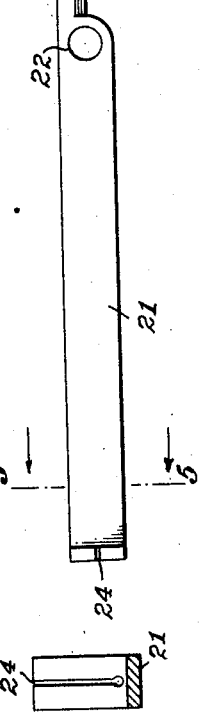
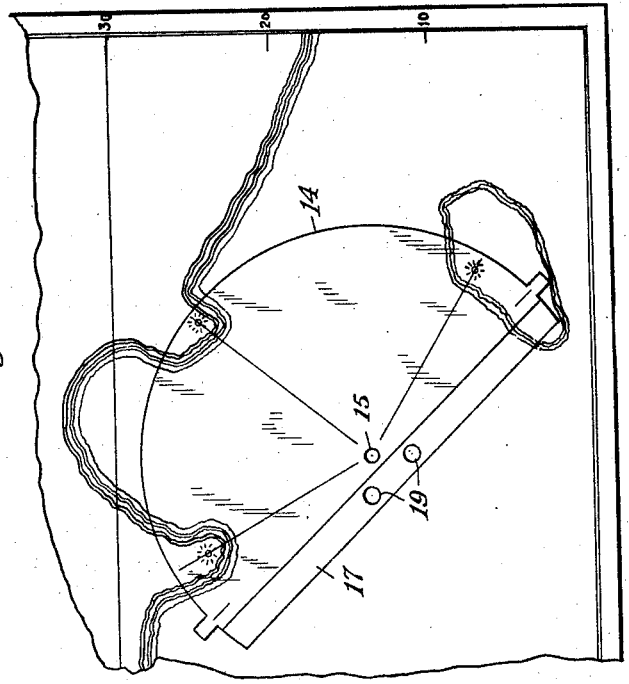
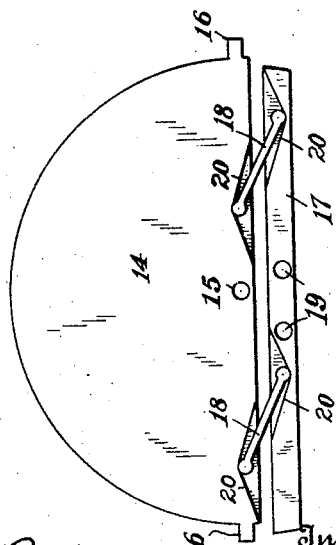

UNITED STATES PATENT OFFICE.

RUDOLF FESTETICS DE TOLNA, OF NEW YORK, N. Y.

CHARTING APPARATUS FOR SHIPS.

1,389,295.  Specification of Letters Patent.  Patented Aug. 30, 1921.

Application filed October 1, 1919. Serial No. 327,705.

*To all whom it may concern:*

Be it known that I, RUDOLF FESTETICS DE TOLNA, a citizen of the United States, residing at New York, in the county of New York and State of New York, have invented certain new and useful Improvements in Charting Apparatus for Ships, of which the following is a full, clear, and exact description, such as will enable others skilled in the art to which it appertains to make and use the same.

This invention is especially directed to instruments for use in navigation, and is designed to provide a simple device wherewith the taking of bearings and the charting of a ship's position may be expeditiously, accurately and easily made without the necessity for mathematical calculation.

It is an object of the invention to provide an improved device, of the character mentioned, which is capable of inexpensive manufacture, easy installation, and rapid and dependable use.

Other objects and advantages will be in part noted hereinafter in connection with the following description of the accompanying drawings which illustrate a preferred embodiment of the invention and in which, Figure 1 is an elevation, partly in section, of the improved device;

Fig. 2 is a plan of the base-plate thereof;

Fig. 3 is a top view of the device;

Fig. 4 is a plan of the sighting arm;

Fig. 5 is a view on the line 5—5 of Fig. 4;

Fig. 6 is a view on the line 6—6 of Fig. 4;

Fig. 7 is a bottom view of the plotting table removed, and

Fig. 8 is a bottom view thereof showing the manner of its use in locating the observer's position after the sighting is completed.

In general, there is shown a flat, transparent plotting table having pivoted thereon a sighting arm which includes a straightedge so arranged that an observer may successively train the instrument on a plurality of known points and plot the directions thereof on the table; the latter being then adapted for application to a locality chart so that the plotted bearings register with the corresponding sighted points whereby the intersection of the plotted directional lines indicates the position from which the observations were taken.

Referring more particularly to the drawings, there is represented a standard or pedestal 1 having an enlarged base 2 with a rectangular (or non-circular) projection 3 to fit within a recess 4 of a base-plate 5 (Fig. 2), the latter in turn being secured to the deck or other convenient part of a ship in a predetermined relation to the longitudinal center line thereof, for example, in parallelism thereto and thus to the ship's instant course. The base-plate 5 may also have one or more threaded recesses 6 to receive clamping bolts 7 extending through complementary apertures of the pedestal base 2. By this construction the pedestal and its parts may be readily installed in position or removed as desired.

The pedestal has mounted at its upper end a flat and preferably circular table 8 connected through a swivel or universal joint 9 and having a depending weight 10 operative by gravity to stabilize the table and maintain it in a horizontal plane. The table, as shown in Fig. 3, preferably has a depressed center bounded by flange 11 while the latter is provided with means such as recesses or pins 12 at ninety degree intervals, two of the recesses or pins being located on a diametrical line in parallel with the ship's course when the instrument is mounted. At the center of the table is an upstanding pin 13 for the purpose presently described.

As also shown in Fig. 3 there is provided what may be termed a plotting table 14 of semi-circular shape, flat, preferably non-frangible and transparent of material such as celluloid or glass with a slightly glazed upper surface capable of receiving pencil marks and from which such marks may be erased so that this table may be repeatedly used. Table 14 has a center apertured hub 15 to receive the aforementioned pin 13 and has two edge lugs 16 to fit two opposite recesses 12, whereby, when positioned the recording table has its full diameter line in parallelism with the ship's keel. In addition, the semi-circular edge of table 14 may be provided with degree marks as shown.

A member 17 is connected by two spaced links 18 with the plotting table 14 (see Fig. 7) in a manner whereby the member may be held stationary for example as through a pair of finger holes 19 and table 14 relatively moved but only with the straight diameter thereof in parallelism to the direction of the number. Links 18 are also disposed in recesses 20 so that both the upper and lower surfaces of the plotting table are flat.

There is further provided a sighting arm 21 having a central aperture 22 to fit over and pivot on the hub 15 and having a straight edge 23 extending radially from the common center of pin 13, hub 15 and aperture 22. Arm 21 is free to swing, and has at one end an upright with a vertical slit 24 and at the other end an upright with a center sight 25.

For taking an observation the parts are assembled as shown in Figs. 1 and 3. In use, the observer, by sighting through slit 24 over top of sight 25, trains the arm 21 on a known stationary object such as a light and immediately draws a line on the recording table 14 along straight-edge 23. The arm 21 is then swung to sight and record similarly a second, and if possible, a third known object. If but two sights may be taken, the compass direction of the ship's course is also noted and the directions of the plotted objects thus ascertained. Next the plotting table is removed and placed upon a chart of the locality with the straight member 17 positioned in the known compass direction of the ship's keel at the time of the observation. The plotting table may then be readily shifted about to cause the plotted lines to register with the observed points on the map, whereupon the intersection of the lines may be indicated by a mark, such as a pin-hole, through the aperture of hub 15, and such point immediately indicates the true position of the ship at the moment of the observation.

Transparent triangles may be used equally well instead of the parallel rule shape.

It will thus be noted that the apparatus as above described is well adapted to carry out the purposes and fulfill the advantages above indicated, among others.

Having described my invention, what I claim is new, and desire to secure by Letters Patent is:

1. In apparatus for the purpose set forth, in combination, a transparent plotting table having a straight edge, and a member having a straight edge connected thereto, said table being movable relatively to said member but only with said straight edges maintained in parallelism, and means for maintaining in parallelism the edges of the plotting table and the member pivotally connected thereto.

2. In apparatus for the purpose set forth, in combination, a semi-circular transparent plotting table having degree marks around its arcuate edge, and a member connected to said table and having a straight edge adjacent the straight diameter edge of the latter, said table being pivotally movable relatively to said member but only with said straight edges maintained in parallelism, and means for maintaining in parallelism the edges of the plotting table and the member pivotally connected thereto.

3. In charting apparatus for ships, in combination, a fixed supporting standard, a transparent plotting table mounted removably on said table and standard being provided with means for predetermining the positions of said table on said standard, said standard and a member adapted to be pivotally associated with said table and having a straight edge disposed radially of its axis of motion whereby a plurality of lines indicative of successively sighted directions may be plotted on said table from a given point.

In testimony whereof I affix my signature, in the presence of two witnesses.

RUDOLF FESTETICS DE TOLNA.

Witnesses:
 MYRTLE B. PITZER,
 SARA B. MAPES.